United States Patent

Thomas

[15] 3,706,460
[45] Dec. 19, 1972

[54] SHOPPING CART

[72] Inventor: James L. Thomas, 6201 Bethia Lane, Brooklyn Park, Minn. 55429

[22] Filed: Sept. 4, 1970

[21] Appl. No.: 69,840

[52] U.S. Cl. .......................280/33.99 F, 186/1 AC
[51] Int. Cl. ..............................................B62b 11/00
[58] Field of Search .......280/33.99, 47.35; 186/1 AC

[56] References Cited

UNITED STATES PATENTS

| | | | |
|---|---|---|---|
| 2,639,161 | 5/1953 | Goldman | 280/33.99 S |
| 2,727,750 | 12/1955 | Noll | 280/33.99 H |
| 2,812,187 | 11/1957 | Nicholl et al. | 280/33.99 F |
| 2,958,536 | 11/1960 | Young | 280/33.99 F |
| 3,245,498 | 4/1966 | Stanley et al. | 280/33.99 F X |

FOREIGN PATENTS OR APPLICATIONS

| | | | |
|---|---|---|---|
| 962,378 | 7/1964 | Great Britain | 280/33.99 F |

*Primary Examiner*—Leo Friaglia
*Assistant Examiner*—Milton L. Smith
*Attorney*—Frederick E. Lange, William C. Babcock and Eugene L. Johnson

[57] ABSTRACT

An expandable shopping cart having an extension basket movable from a retracted position for storage, to an extended position for use. The extension basket increases the volumetric capacity of the conventional shopping cart by providing an additional separate compartment when extended. When retracted the shopping cart is nestable with similar carts for storage in the conventional manner. The extension basket may be mounted on conventional nonexpandable shopping carts without redesign or change in the construction of the conventional cart.

2 Claims, 12 Drawing Figures

PATENTED DEC 19 1972

INVENTOR.
JAMES L. THOMAS
BY Eugene L. Johnson
ATTORNEY

PATENTED DEC 19 1972

INVENTOR.
JAMES L. THOMAS
BY
*Elwyn L. Johnson*
ATTORNEY

SHOPPING CART

BACKGROUND OF THE INVENTION

The invention resides generally in the field of expandable containers, and more particularly, in the field of expandable shopping carts for use in self-service supermarkets, discount stores, drug stores and the like.

Self-service retail outlets are increasing in number and the variety of items available in a single self-service store similarly is increasing. The increase in variety of goods available in a single retail outlet has led to large volume buying by the consumer at a single stop. The volume of items purchased is frequently limited only by the volumetric capacity of the shopping cart. With the conventional nonexpandable shopping cart presently in wide spread use, when the cart is full the consumer stops buying and is forced to delay certain purchases until a subsequent shopping trip is made. This results in inconvenience to the consumer and possible lost sales for the retail outlet.

The limited fixed capacity of the conventional shopping cart has been recognized as a problem in the prior art. The Nichol et al. U.S. Pat. No. (2,812,187) and the Young U.S. Pat. No. (2,958,536) provide an expandable basket through the use of a false bottom. In both Nichol and Young the false bottom is lowered as weight accumulates in the cart. This approach has the disadvantage that certain items may be crushed by the weight of the substantial number of items resting on those items in the bottom. The design has the further disadvantage that certain items may be difficult to reach in the lowered false bottom when the shopping cart is unloaded at the checkout counter. In addition, the prior art expandable carts have led to problems in nesting due to the increased appendages necessary for lowering and raising the bottom. Moreover, the expandable feature can be obtained only by construction of the cart initially to embody the false bottom, as distinguished from converting conventional nonexpandable carts.

SUMMARY

The present invention provides additional space, that is, expands the volumetric capacity of a shopping cart without the problems inherent in the expandable carts of the prior art. In particular, the extension does not deepen the main basket with the attendant problems of inconvenient depth for removal, crushing of items at the lower depths, and increased difficulty in stacking. The present invention may be attached to existing shopping carts without redesign, reconstruction or other burdensome adaptations to the existing conventional cart. It provides a separate, distinct compartment that can be used to segregate fragile items from heavier items in the shopping cart as well as for items that simply cannot be carried in the limited capacity of the conventional cart.

The invention is characterized by an extension basket mounted to the main basket of the conventional shopping cart in such a manner as to substantially envelop the forward portion of the main basket when in the retracted position, and to provide a separate compartment forward of the main basket when in the extended position. The extension basket is mounted for convenient movement from the retracted position to the extended position by either pivoting or sliding from one position to the other.

The primary object of the present invention is to provide an expandable shopping cart in which an additional enlarged separate compartment is provided forward of the main basket. Another object is to provide a shopping cart extension readily attachable to existing shopping carts without redesign, reconstruction or cutting of the existing cart. A further object is to provide the foregoing features without destroying the ability of the cart to nest with similar carts.

DESCRIPTION OF PREFERRED EMBODIMENTS

Two embodiments of the present invention are shown. The primary embodiment, characterized by a pivotally mounted extension basket, is shown in FIGS. 1–7. A second embodiment, characterized by a roll-out extension basket, is shown in FIGS. 8–12.

Figure 1:
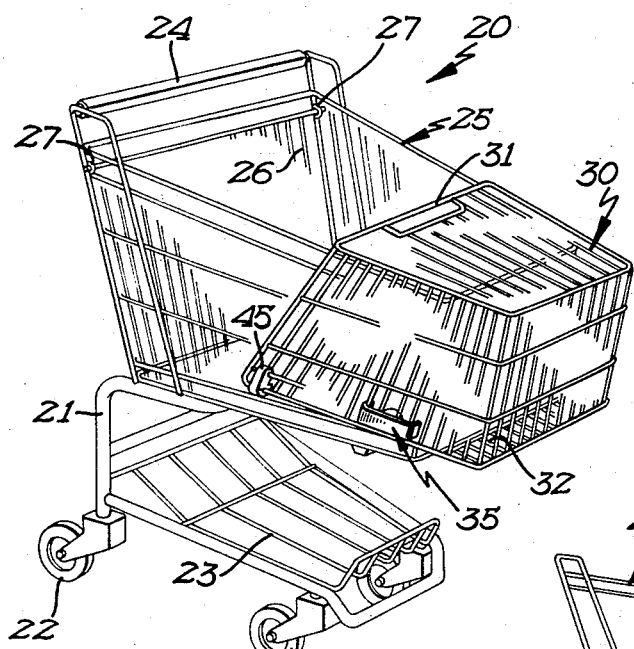
FIG. 1 is a perspective view of the preferred embodiment of the present invention and shows a pivotally mounted extension basket.

The construction of the primary embodiment may be generally understood with reference to FIG. 1. In FIG. 1, shopping cart 20 is shown with a conventional frame 21 mounted on caster wheels 22. Lower rack 23 is provided for heavy items. Handle 24 serves as a means for pushing the cart. Main basket 25 of cart 20 is provided with a suspended, hinged rear wall 26 which is hinged at 27 in the conventional manner to provide for nesting of similarly shaped carts, all in the conventional manner.

The embodiment of FIGS. 1–7 is characterized by a pivotable extension basket 30 which defines handle 31, a rear wall section 32 and side walls, a bottom wall and an end wall, apparent in FIG. 1.

Figure 2:
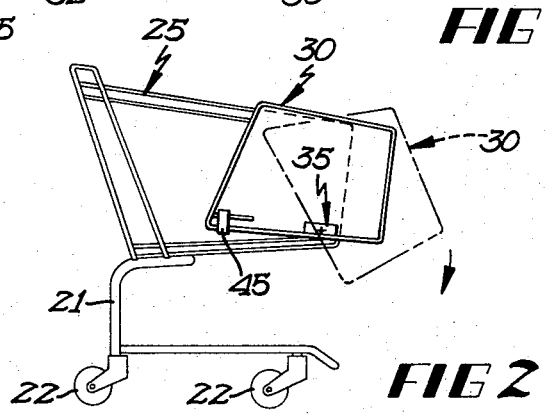
FIG. 2 is a schematic side view of the shopping cart shown in FIG. 1 and shows the extension basket in the retracted position and (in phantom) movement from the retracted position to the extended position.
Figure 3:
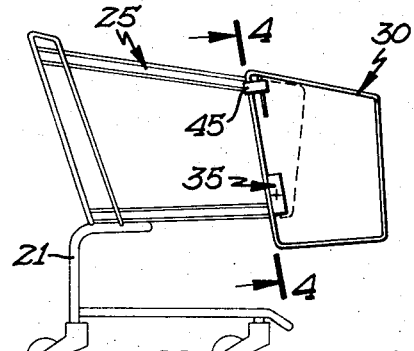
FIG. 3 is a schematic side view similar to the view of FIG. 2 and shows the extension basket in the extended position.

The general operation of extension basket 30 may be readily seen by viewing FIGS. 1, 2 and 3. In FIGS. 1 and 2 extension basket is shown in the retracted position with extension basket 30 enveloping the forward portion of main basket 25. In FIG. 2 the basket is shown (in phantom) in an intermediate position during movement from the retracted position to the extended position of FIG. 3. In the retracted position of FIG. 2 cart 20 may be nested with similar carts, and in the extended position shown in FIG. 3, an additional compartment is provided to thereby increase the capacity of cart 20 and provide a separate compartment for fragile items.

Figure 5:
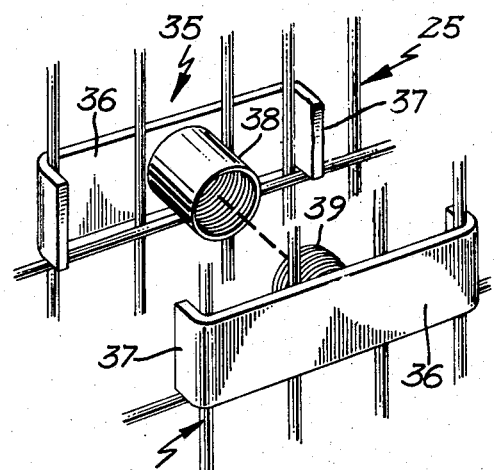
FIG. 5 is an enlarged exploded perspective view of the brackets for pivotally mounting the extension basket to the main basket.

The detailed construction of shopping cart 20 may be understood by reference first to FIGS. 1, 3 and 5. Pivot brackets 35, best seen in FIG. 5, are formed with backing plate 36 secured to the main or extension basket by means of bent flange portion 37. An internally threaded nipple 38 is secured to one plate 36 and an externally threaded stud 39 is secured to the other. Externally threaded stud 39 is threaded into nipple 38 before the flanges 37 of plates 36 are formed about the vertical wires of extension basket 30 and main basket 25. Thus, extension basket 30 is pivotally secured to main basket 25 for pivotal movement about an axis perpendicular to the direction of travel of cart 20 passing through the axis of nipple 38 and stud 39 and intersecting main basket 25 in the lower front portion thereof.

Figure 6:
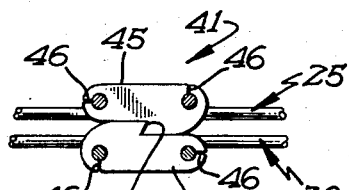
FIG. 6 is a top view of the stops on the side of the main basket and extension basket, shown in the engaged position.
Figures 4, 7:
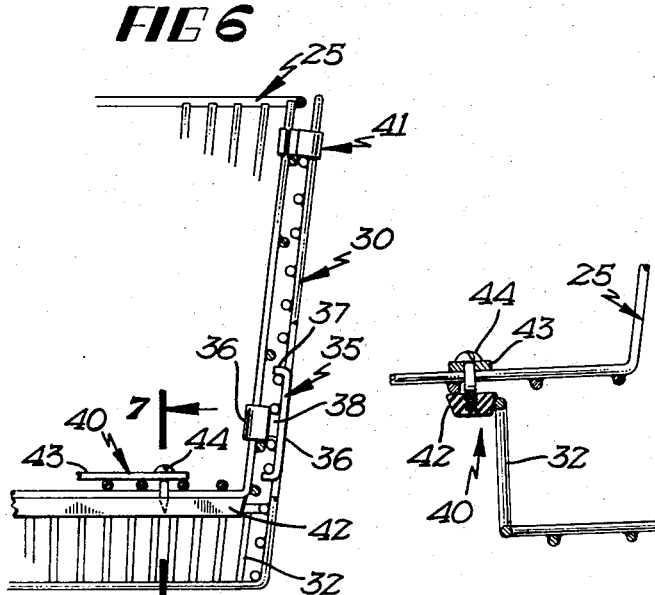
FIG. 4 is a partial sectional view taken on the line 4—4 of FIG. 3 and shows the extension basket in the extended position.
FIG. 7 is a partial sectional view taken on the line 7—7 of FIG. 4 and shows the extension basket in the extended position engaging the stop disposed at the bottom of the main basket.

Extension basket 30 is stopped in the extended position of FIG. 3 by means of bottom stop 40 shown in FIGS. 4 and 7, and by means of side stops 41 shown in FIGS. 1, 4 and 6. With reference to FIGS. 4 and 7, bottom stop 40 includes rubber stop 42 secured to the bottom of main basket 25 by means of plate 43 and screws 44. As best seen in FIG. 7, rear wall 32 of extension basket 30 engages rubber stop 42 to define the extended position of extension basket 30. The position of stop 40 may be adjusted along the bottom of main basket 25 to stop extension basket 30 in the most desirable position.

Side stops 41 are best seen in FIGS. 1, 4 and 6. Each side stop 41 includes a pair of rubber stops 45, best seen in FIG. 6. Stops 45 are secured to the wires of main basket 25 and extension basket 30 by simply clamping each stop 45 to the respective basket through slots 46 oriented as shown in FIG. 6. Each stop 45 includes a projection 47 which engages a similar projection on the adjacent stop 45 when extension basket 30 reaches the extended position of FIG. 3. This engagement is shown in FIG. 6. Side stops 41 stop extension basket 30 simultaneously with the engagement of rear wall 32 of extension basket 30 with bottom stop 40 to provide a three-point stop.

The operation of the embodiment shown in FIGS. 1–7 includes the ability of the extension basket 30 to be mounted on existing carts without redesign or adaptation of the existing cart in any way. More particularly, bottom stop 40 can be readily mounted on the main basket 25 of an existing cart by simply clamping rubber stop 42 to the bottom of main basket 25 through the use of plate 43 and screws 44. Side stops 45 may be readily clamped to main basket 25 and extension basket 30 through the use of slots 46. In making this installation, the slot 46 running parallel to the length of rubber stop 45 is first clamped into engagement with a wire followed by securing the stop through use of the slot 46 running perpendicular to the length of stop 45. Extension basket 30 is then mounted to main basket 25 by means of pivot brackets 35. In making this installation, stud 39 is threaded into nipple 38 prior to bending of the ends of plates 36 about the vertical wires to form flange portions 37. When stud 39 is threaded into nipple 38 a sufficient distance, flanges 37 of plates 36 are formed to grasp the wires of main basket 25 and extension basket 30, as shown in FIG. 5, to thereby prevent unthreading of the pivot bracket during use.

In use, extension basket 30 may be readily pivoted from the retracted position of FIG. 1 to the extended position of FIG. 3 by simply grasping handle 30 and pulling upwardly and forwardly. Extension basket 30 pivots about pivot brackets 35 until side stops 41 engage simultaneously with the engagement of rear wall 32 of extension basket 30 with bottom stop 40. Thus, a separate compartment is provided with extension basket 30 in the extended position shown in FIGS. 3 and 7, to thereby provide increased volumetric capacity of shopping cart 20. When the cart is empty, extension basket 30 can be retracted to the position shown in FIGS. 1 and 2 to thereby allow nesting of the cart with similar carts.

Figure 8:
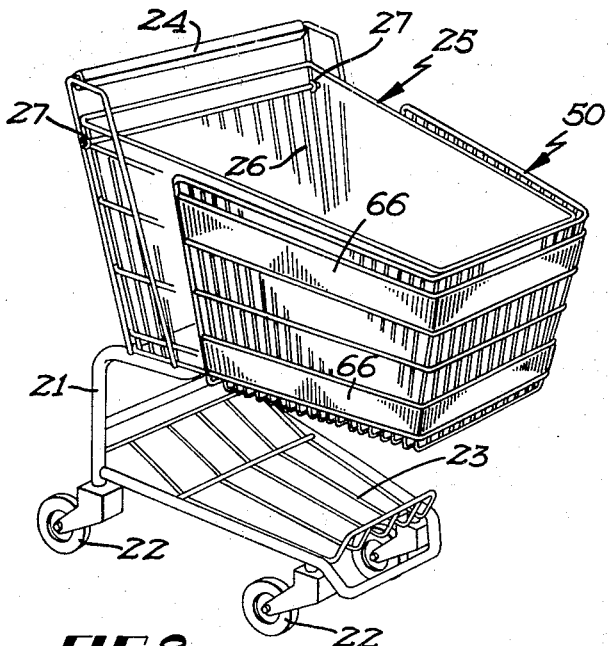
FIG. 8 is a perspective view of a second embodiment of the present invention, and shows a roll-out or slidable extension basket.
Figure 9:
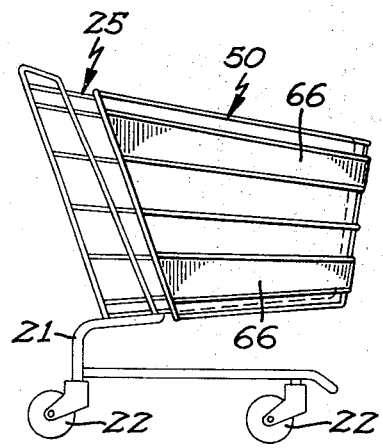
FIG. 9 is a schematic side view of the shopping cart shown in FIG. 8, with the extension basket in the retracted position.
Figure 10:
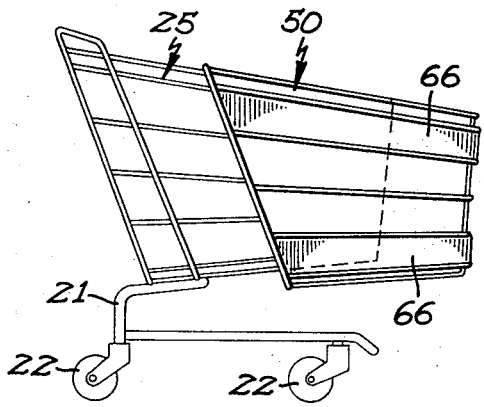
FIG. 10 is a schematic side view similar to FIG. 9 with the extension basket in the extended position.

The second embodiment of the present invention, characterized by a roll-out or slidable extension basket, is shown in FIGS. 8–12. The construction of this embodiment is similar in many respects to the construction of the embodiment shown in FIG. 7. The conventional portions of the shopping cart, namely, frame 21, caster wheels 22, lower rack 23, handle 24, main basket 25 and hinged end wall 26 are identical to corresponding elements of the embodiment of FIGS. 1 and 7. The embodiment of FIGS. 8–12 differs in that, as shown in FIGS. 8, 9 and 10, extension basket 50 is roller mounted to slide from the retracted position of FIGS. 8 and 9 to the extended position of FIG. 10.

Figure 11:
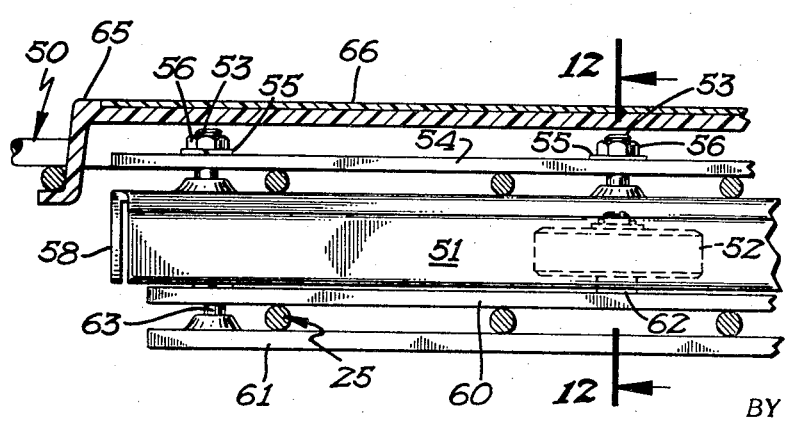
FIG. 11 is a partial top view of the roller mechanism for roll-out or sliding movement of the extension basket from the retracted to the extended position and back.
Figure 12:
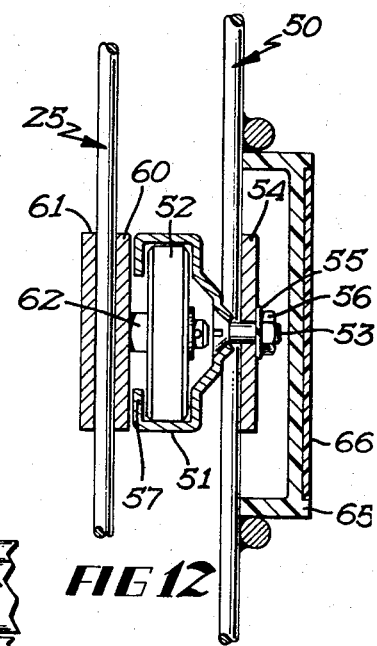
FIG. 12 is a sectional view taken on the line 12—12 of FIG. 11 and shows the roller mechanism.

The mounting and construction of extension basket 50 may be best understood with reference to FIGS. 8, 11 and 12. Extension basket 50 is mounted to track 51, while main basket 25 is mounted to rollers 52. Four roller and track assemblies are provided, two on each side of main basket 25, one above the other. Track 51 extends longitudinally in the direction of travel of the shopping cart and is mounted to extension basket 50 by means of machine screws 53, plate 54, lock washer 55 and nut 56. Track 51 and plate 54 extend a substantial longitudinal distance and a number of machine screws 53 are provided to rigidly secure track 51 to extension basket 50. Track 51 is formed with lateral retaining wall portions 57 and stop 58.

Rollers 52 are mounted to main basket 25 by means of mounting plates 60 and 61. Axle 62 of roller 52 is secured to plate 60, and plate 60 is secured to main basket 25 through machine screws 63 which are threaded into plate 60. The extended portion of extension basket 50 is defined by contact between the rearwardmost roller 52 and stop 58 of track 51.

The cover panel 65, best seen in FIG. 11, having a decorative panel portion 66 is secured to the side of extension basket 50 to hide plate 54 and the roller-track assemblies when viewed from the side. Four such panels 65 are provided, an upper panel and a lower panel on each side of extension basket 50 to hide all four roller-track assemblies. For aesthetics, panel 65 may extend around the forward wall of extension basket 50, as shown in FIG. 8, to provide two continuous panels extending along one side, the front wall, and the other side wall of extension basket 50, one above the other.

The embodiment shown in FIGS. 8–12 provides a separate additional space for consumer goods when extension basket is rolled from the retracted position of FIG. 8 and FIG. 9 to the extended position of FIG. 10. Extension basket 50 may be very easily rolled from the retracted position to the extended position by the consumer and automatically returned to the retracted position as the cart is nested into a similar cart.

Having thus described the invention, the following is claimed:

1. In an expansible shopping cart having a wheel-mounted frame, a main basket mounted to said frame, and a suspended hinged rear wall on said main basket to allow nesting of similar carts in said cart, the improvement comprising:

an extension basket mounted to said main basket, pivotable about a substantially horizontal axis transverse to the direction of travel of said cart and intersecting said main basket in the lower front portion thereof, to move from a retracted position enveloping the forward portion of said main basket to an extended position forward of said main basket whereby said cart is nestable with similar carts when said extension basket is in said retracted position, stop means disposed beneath said main basket engageable by said extension basket when said extension basket is in said extended position, and stop means mounted to the sides of said main basket engageable by said extension basket when said extension basket is in said extended position.

2. The shopping cart of claim 1 wherein said extension basket defines a handle for pivoting said extension basket from said retracted to said extended position.

* * * * *